US012276252B2

(12) United States Patent
Saboori (10) Patent No.: US 12,276,252 B2
(45) Date of Patent: Apr. 15, 2025

(54) SYSTEM AND METHOD FOR ASSEMBLING A WIND TURBINE (71) Applicant: Vestas Wind Systems A/S, Aarhus N (DK)

(72) Inventor: Babak Saboori, Vejle Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/566,139

(22) PCT Filed: May 20, 2022

(86) PCT No.: PCT/DK2022/050103
§ 371 (c)(1),
(2) Date: Dec. 1, 2023

(87) PCT Pub. No.: WO2022/258119
PCT Pub. Date: Dec. 15, 2022

(65) Prior Publication Data
US 2024/0263616 A1 Aug. 8, 2024

(30) Foreign Application Priority Data

Jun. 7, 2021 (DK) .............................. PA 202170291

(51) Int. Cl.
*F03D 13/10* (2016.01)
*B66C 13/40* (2006.01)
(Continued)

(52) U.S. Cl.
CPC ............ *F03D 13/139* (2023.08); *B66C 13/40* (2013.01); *B66C 13/46* (2013.01); *B66C 23/185* (2013.01);
(Continued)

(58) Field of Classification Search
CPC ............................ B66C 23/185; F03D 13/139
See application file for complete search history.

(56) References Cited

U.S. PATENT DOCUMENTS

2016/0063709 A1\* 3/2016 Booij ...................... B66C 13/46
348/142
2016/0229671 A1 8/2016 Herse et al.
(Continued)

FOREIGN PATENT DOCUMENTS

EP 3601139 A1 2/2020
KR 20140079589 A 6/2014
(Continued)

OTHER PUBLICATIONS

Danish Patent and Trademark Office, first technical examination issued in corresponding DK Application No. PA 2021 70291, dated Nov. 30, 2021.
(Continued)

*Primary Examiner* — Sarang Afzali
(74) *Attorney, Agent, or Firm* — Wood Herron & Evans LLP (57) ABSTRACT A method for assembling a wind turbine (10) having a first wind turbine component (20) with a first mounting interface (36) and a second wind turbine component (26) with a second mounting interface (34) includes positioning the second wind turbine component (26) relative to the first wind turbine component (20) such that the second mounting interface (34) is located a vertical distance above the first
(Continued)

mounting interface (36), aligning the second mounting interface (34) to the first mounting interface (36), lowering the second wind turbine component (36) toward the first wind turbine component (20) to contact each other, and connecting the second mounting interface (34) to the first mounting interface (36). At any time during assembly when the second mounting interface (34) vertically overlaps the first mounting interface (36), the vertical distance between second mounting interface (34) and the first mounting interface (36) is maintained below a predetermined threshold (D). A system for assembling the wind turbine (10) is also disclosed.

13 Claims, 9 Drawing Sheets

(51) Int. Cl.
  B66C 13/46 (2006.01)
  B66C 23/18 (2006.01)
  B66C 23/52 (2006.01)
(52) U.S. Cl.
  CPC ........ *B66C 23/52* (2013.01); *F05B 2230/604* (2013.01); *F05B 2270/8041* (2013.01)

(56) References Cited

U.S. PATENT DOCUMENTS

| | | | |
|---|---|---|---|
| 2018/0163703 A1* | 6/2018 | Jensen | B66C 13/08 |
| 2018/0362306 A1 | 12/2018 | Lopez-Benedito et al. | |
| 2019/0170121 A1 | 6/2019 | Mtauweg | |
| 2020/0200148 A1* | 6/2020 | Garduno Estebanez | F03D 13/20 |
| 2021/0284506 A1* | 9/2021 | Moeller | B66C 13/105 |

FOREIGN PATENT DOCUMENTS

| | | |
|---|---|---|
| WO | 2017012680 A1 | 1/2017 |
| WO | 2018228810 A1 | 12/2018 |
| WO | 2020163288 A2 | 8/2020 |

OTHER PUBLICATIONS

International Searching Authority, International Search Report and Written Opinion issued in corresponding PCT Application No. PCT/DK2022/050108, dated Aug. 8, 2022.

* cited by examiner

SYSTEM AND METHOD FOR ASSEMBLING A WIND TURBINE

TECHNICAL FIELD

This invention relates generally to wind turbines, and more particularly to a system and method for assembling two components of a wind turbine by limiting a vertical separation between the two components during assembly.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator. Wind turbines may be located either on a land mass or within a body of water.

The tower of a wind turbine is typically assembled from multiple tower sections positioned one on top of the other to form the tower. In one arrangement, a tower may include a lower tower section, one or more middle tower sections, and an upper tower section. During assembly, the lower tower section may be secured to a foundation of some sort (e.g., an anchor cage for on-shore wind turbines or a pile or platform for off-shore wind turbines), the one or more middle tower sections may lifted onto the top of the lower tower section, then the upper tower section may be lifted onto the top of the uppermost middle tower section. Finally, the nacelle may be lifted onto the top of the upper tower section. A lifting device, such as a crane, may be used to lift the tower sections and nacelle into place.

Because the tower sections, and especially the nacelle, are quite heavy (e.g., hundreds of tons), the assembling crew must use extreme care to minimize the risks should one of the tower sections or nacelles fall or become loosened while being lifted by the crane. For wind turbine manufacturers, it is desirable to minimize and perhaps eliminate the time working under a suspended load (WUSL). For example, when the nacelle is being lifted onto the upper tower section, certain safety protocols may require personnel inside the tower to vacate the tower until the crane has lifted the nacelle and placed it onto the top of the upper tower section. After the nacelle is resting, but not yet secured, to the top of the upper tower section, personnel must then reposition themselves at the top of the tower in order to secure the nacelle to the top of the upper tower section. This may entail personnel climbing ladders on the inside of the tower to reach its upper end. Alternatively, the tower may include a small lift for transporting personnel to the top of the tower. In any event, the initial evacuation and then subsequent repositioning of personnel in the tower may take significant time (e.g., on the scale of multiple hours) depending on the number of personnel, overall height of the tower, and mechanism (e.g., ladder, lift, etc.) for moving personnel to the top of the tower. One of the major sources of costs for wind turbine assembly is the rental/usage of the large cranes and other lifting apparatus required to complete the assembly of the wind turbine. Thus, this downtime for moving personnel out of and into the tower during assembly is a source of inefficiency and cost. Moreover, this downtime scales upwardly (e.g., perhaps on the order of days) for wind farm installations, where many wind turbines may be assembled during a single rental period of the crane or lifting apparatus.

As mentioned above, some wind turbines may be located in an open body of water, such as in an ocean or sea. When assembling a wind turbine in a body of water, the weather and its influence on the surrounding waters must be constantly monitored as it may change quickly. The lifting of the nacelle must be accomplished while the ocean is relatively calm. If the assembly of the nacelle to the tower extends over a prolonged period of time because personnel need to be evacuated and repositioned in the tower, approaching sever weather may require the assembly be scrubbed until the severe weather has passed. Thus, for off-shore wind turbine assembly, the need to evacuate personnel from the tower and then reposition personnel in the tower during a lift may further increase the assembly time, and therefore costs.

Thus, there is a need for a system and method of assembling a wind turbine that reduces the assembly time and associated costs. More particularly, there is a need for a system and method of assembling components of a wind turbine that allows personnel to remain in the tower while the components are being lifted into place during the assembly.

SUMMARY

To these and other ends, a method for assembling a wind turbine having a first wind turbine component with a first mounting interface, which may be secured to a foundation, and a second wind turbine component with a second mounting interface configured to be connected to the first wind turbine component at the first mounting interface is disclosed. The method includes positioning the second wind turbine component relative to the first wind turbine component such that the second mounting interface is located a vertical distance above the first mounting interface; aligning the second mounting interface to the first mounting interface; lowering the second wind turbine component toward the first wind turbine component so that the first mounting interface and the second mounting interface contact each other; and connecting the second mounting interface to the first mounting interface. In accordance with the method, at any time during assembly when the second mounting interface vertically overlaps the first mounting interface, the vertical distance between second mounting interface and the first mounting interface does not exceed a predetermined threshold.

In one embodiment, the method further includes determining whether the vertical distance between the first and second mounting interfaces exceeds the predetermined threshold and providing an indication when the vertical distance between the first and second mounting interfaces exceeds the predetermined threshold. In an exemplary embodiment, the step of determining whether the vertical distance between the first and second mounting interfaces exceeds the predetermined threshold may further include transmitting a signal from a transmitter attached to one of the first or second wind turbine components and receiving the signal by a receiver attached to the other of the first or second wind turbine components; providing a first indication when the transmitter and receiver determine that the vertical distance between the first and second mounting interfaces is substantially at or less than the predetermined threshold; and providing a second indication when the transmitter and receiver determine that the vertical distance between the first and second mounting interfaces exceeds the predetermined threshold.

In one aspect of the invention, a vision system may be used to carry out the method. For example, in one embodiment the method may include providing an indicator on one of the first or second wind turbine components for indicating when the vertical distance between the first and second mounting interfaces exceeds the predetermined threshold and monitoring the indicator using a first camera mounted to one of the first or second wind turbine components. In one embodiment, aligning the second mounting interface to the first mounting interface may include mounting a second camera to one of the first or second wind turbine components and using the second camera to axially align the second mounting interface to the first mounting interface. Moreover, aligning the second mounting interface to the first mounting interface may include mounting a third camera to one of the first or second wind turbine components and using the third camera to rotationally align the second mounting interface to the first mounting interface.

In one embodiment, aligning the second mounting interface to the first mounting interface may further include providing at least one alignment guide mounted to one of the first or second wind turbine components, wherein the at least one alignment guide is moveable from a retracted position to a deployed position, and moving the at least one alignment guide from the retracted position to the deployed position. When in the deployed position, the at least one alignment guide is configured to contact the other of the first or second wind turbine components to facilitate axially aligning the second mounting interface with the first mounting interface. In one embodiment, moving the at least one alignment guide from the retracted position to the deployed position may further include remotely actuating the at least one alignment guide. The vision system may include a fourth camera and the method may include mounting the fourth camera to one of the first or second wind turbine components and using the fourth camera to observe the at least one alignment guide.

In one embodiment of the method, the predetermined threshold may be less than about 1.0 meters, and preferably less than about 0.5 meters. In an exemplary embodiment, the predetermined threshold may be about 0.35 meters. Moreover, in one embodiment, the first wind turbine component may be a tower section and the second wind turbine component may be a nacelle. In an alternative embodiment, the first wind turbine component may be a tower section and the second wind turbine component may be another tower section. In still a further embodiment, the first wind turbine component may be a foundation and the second wind turbine component may be a tower section (e.g., the lowermost tower section).

In a further embodiment, a system for assembling a wind turbine having a first wind turbine component with a first mounting interface, which may be secured to a foundation, and a second wind turbine component with a second mounting interface configured to be connected to the first wind turbine component at the first mounting interface is disclosed. The system includes a separation verification device including a transmitter configured to be coupled to one of the first or second wind turbine components and a receiver configured to be coupled to the other of the first or second wind turbine components. The separation verification device is configured to determine whether a vertical distance between the first and second mounting interfaces exceeds a predetermined threshold. The system further includes an indicator configured to be coupled to one of the first or second wind turbine components and configured to provide an indication when the vertical distance between the first and second mounting interfaces exceeds the predetermined threshold. The system is configured such that at any time during assembly when the second mounting interface vertically overlaps the first mounting interface and the vertical distance exceeds the predetermined threshold, the indicator is configured to provide the indication.

In one embodiment, the indicator is configured to provide a first indication when the transmitter and receiver determine that the vertical distance between the first and second mounting interfaces is substantially at or less than the predetermined threshold, and the indicator is configured to provide a second indication when the transmitter and receiver determine that the vertical distance between the first and second mounting interfaces exceeds the predetermined threshold. By way of example, the transmitter may include a laser transmitter and the receiver may include a laser receiver. One of the laser transmitter or receiver may include the indicator.

The system may additionally include a vision system. For example, in one embodiment, the system may include a first camera configured to be mounted to one of the first or second wind turbine components and configured to view the indicator. The system may further include a second camera configured to be mounted to one of the first or second wind turbine components and configured to facilitate axial alignment of the first and second mounting interfaces. Furthermore, the system may include a third camera configured to be mounted to one of the first or second wind turbine components and configured to facilitate rotational alignment of the first and second mounting interfaces.

In one embodiment, the system may include at least one alignment guide moveable between a retracted position and a deployed position, wherein the at least one alignment guide is configured to be coupled to one of the first or second wind turbine components, and wherein when in the deployed position, the at least one alignment guide is configured to contact the other of the first or second wind turbine component to facilitate axially aligning the second mounting interface with the first mounting interface. In one embodiment, the at least one alignment guide may be remotely actuatable to move between the retracted position and the deployed position. The vision system may include a fourth camera configured to be mounted to one of the first or second wind turbine components and configured to view the at least one alignment guide.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
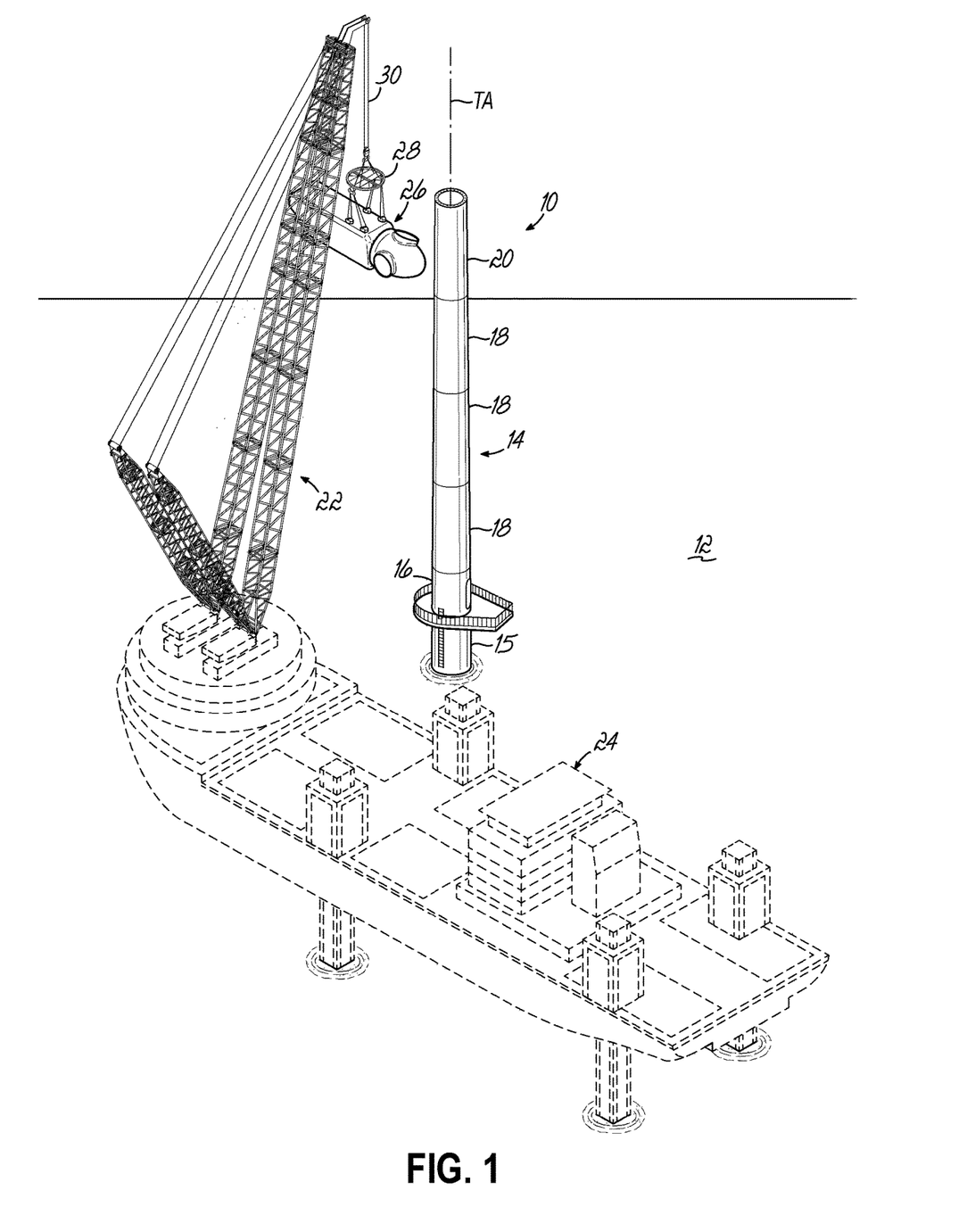
FIG. 1 is a perspective view of an off-shore wind turbine being assembled in accordance with an embodiment of the invention.

FIG. 1 depicts a wind turbine 10 being assembled in an off-shore location, i.e., in a body of water 12. As depicted, a tower 14 is anchored to the bottom of the body of water 12 through a suitable foundation 15. The tower 14 includes a longitudinal tower axis TA. The tower 14 is comprised of a lower tower section 16, a plurality of middle tower sections 18, and an upper tower section 20. A crane 22 connected to a ship 24 is shown lifting a nacelle 26 for its final assembled position atop the upper tower section 20. The nacelle 26 is connected to the crane via a spreader bar 28, which is capable of rotating the nacelle 26 about a vertical axis relative to lifting cables 30. The nacelle 26 includes a tower connection section 32 (FIG. 2A) having a mounting interface 34 (e.g., such as a mounting flange) that is configured to couple the nacelle 26 to the upper tower section 20, and more particularly to a mounting interface 36 (e.g., such as a mounting flange) at the upper end of the upper tower section 20. The nacelle 26 includes a longitudinal nacelle axis NA.

Figure 2A:
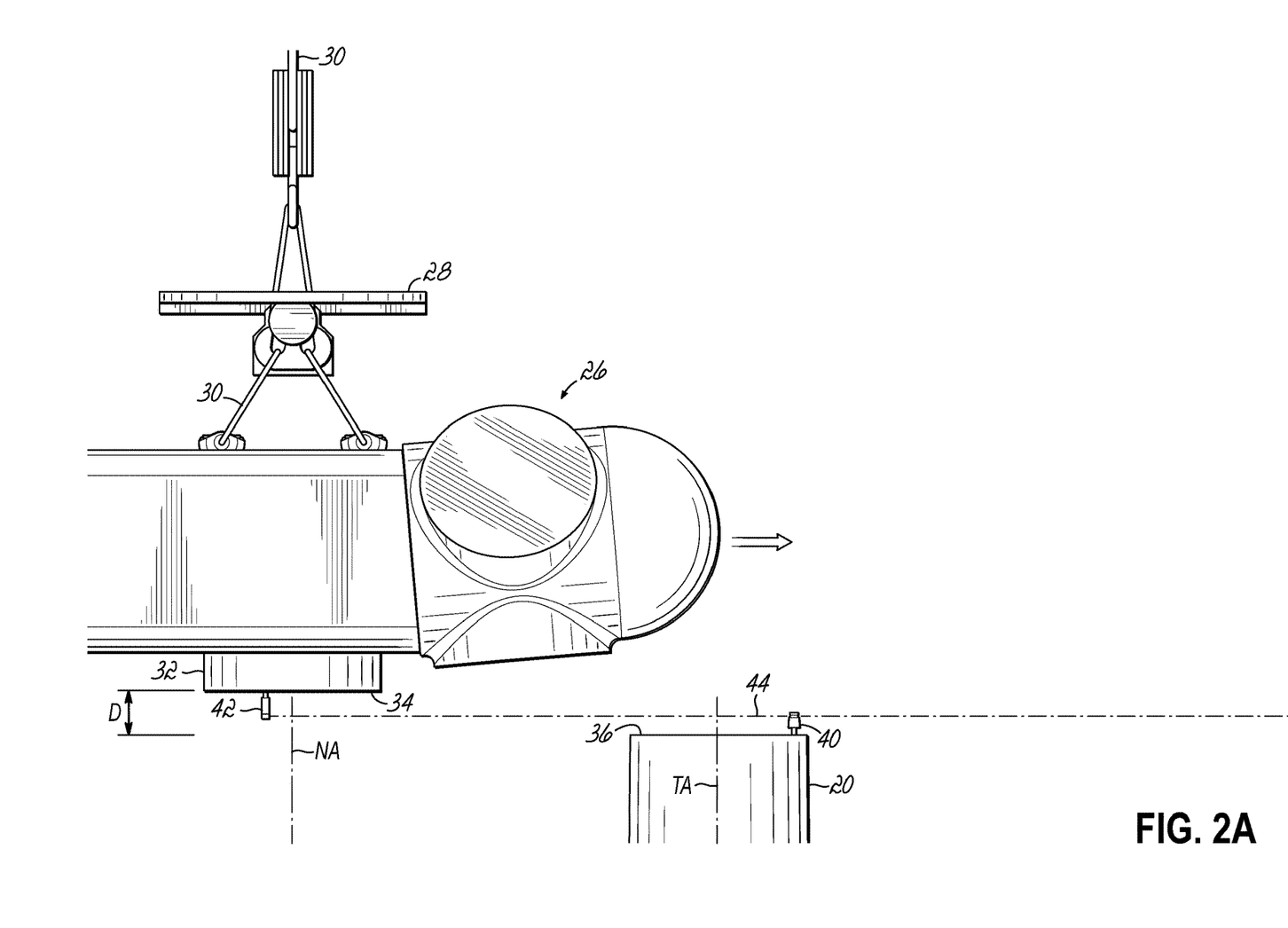
FIG. 2A is an enlarged elevational view of a nacelle positioned along the side of the tower of FIG. 1 at a predetermined height.
Figure 2B:
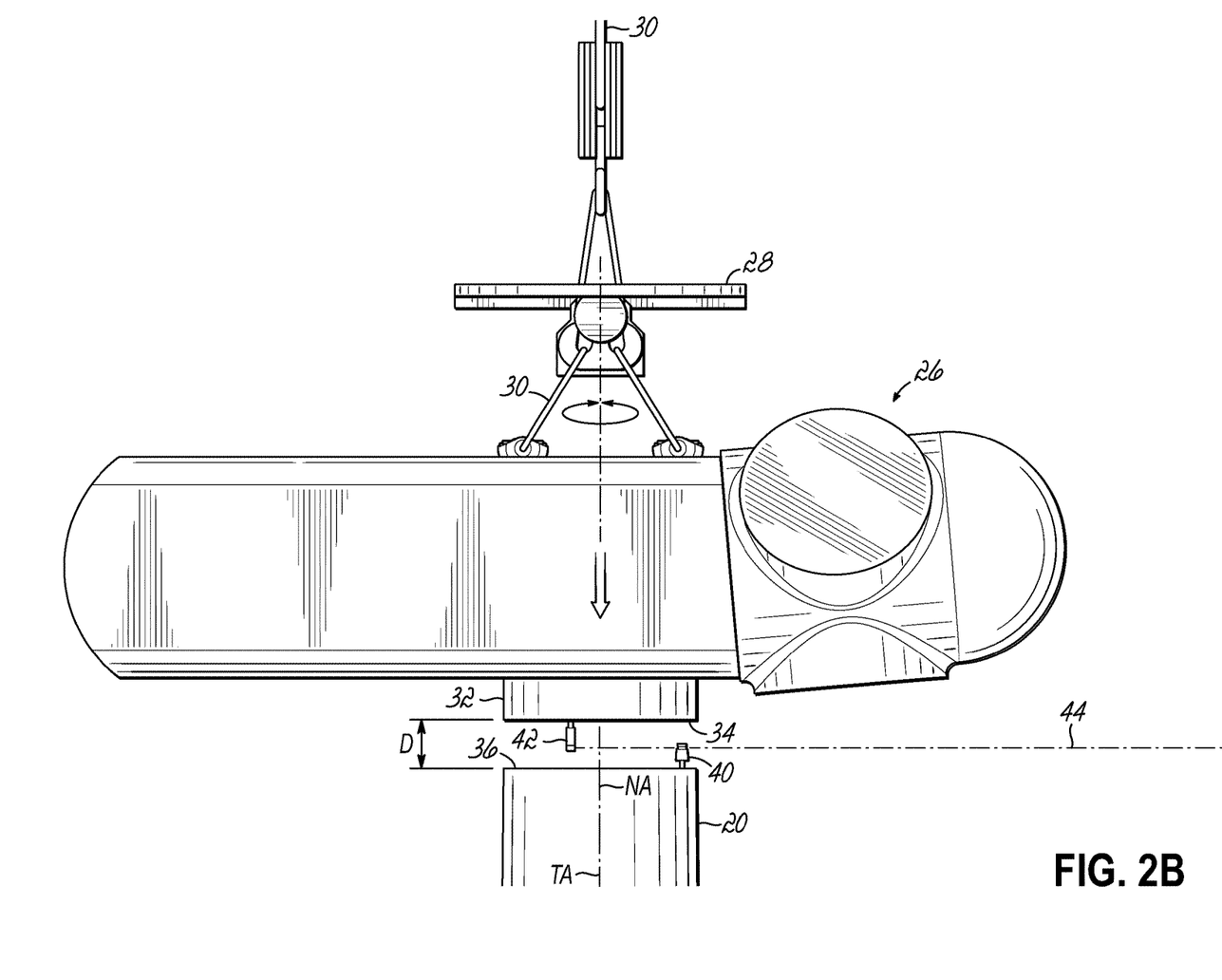
FIG. 2B is an enlarged elevational view of the nacelle of FIG. 2A positioned above the tower at a predetermined height.

One aspect of the assembly process is to lift the nacelle 26 until the mounting interface 34 of the nacelle 26 is positioned a vertical distance above the mounting flange 36 of the upper tower section 20. The vertical distance may be selected so as to minimize the distance between the mounting interface 34 of the nacelle 26 and the mounting interface 36 of the upper tower section 20 while the nacelle 26 is being placed atop the upper tower section 20. For example, in an exemplary embodiment, at any time during the assembly when the mounting interface 34 of the nacelle 26 vertically overlaps the mounting interface 36 of the upper tower section 20, the vertical distance between mounting interfaces 34, 36 may not exceed a predetermined threshold. As used herein, vertically overlap means that at least one point of the mounting interface 34 of the nacelle 26 is positioned directly vertically above a point of the mounting interface 36 of the upper tower section 20. FIG. 2A, for example, illustrates no vertical overlap between the mounting interfaces 34, 46 while FIG. 2B illustrates a substantially total vertical overlap between the mounting interfaces 34, 36.

In any event, by not exceeding the predetermined threshold when there is a vertical overlap between the mounting interfaces 34, 36 during the lift, should there be a failure in the lifting system, the nacelle 26 will have a relatively short distance of uncontrolled movement before making contact with the upper tower section 20. As a result, it is believed that the nacelle 26 will not be capable of causing significant damage (e.g., catastrophic damage) to the tower 14 and, more specifically, the upper tower section 20. Consequently, personnel located in the tower 14 during the assembly process will likely not be required to fully vacant the tower 14 while the nacelle 26 is being lifted and placed atop the upper tower section 20. Instead, the technicians may be required to move from an upper platform at the exposed end of the upper tower section 20 to a platform lower in the tower and beneath the upper platform. As one can recognize and appreciate, having personnel move down only one or a few platform levels within the tower 14 while the nacelle 26 is being lifted into place, as opposed to vacating the entire tower 14 during the lift, will save a considerable amount of time in the assembly process.

This time savings is made possible by controlling the vertical separation distance between the mounting interfaces 34, 36 of the nacelle 26 and upper tower section 20 to not exceed the predetermined threshold. By considering the weight of the nacelle 26 and the structural aspects of the tower 14, one can estimate the damage response on the tower 14 caused by the nacelle 26 during, for example, a free fall. For example, various software packages can model the response of the tower 14 to an imposed load that simulates contact with a nacelle 26 in free fall. Through this analysis, the vertical separation distance threshold may be established such that the estimated damage presents minimal risk to personnel located in the tower 14 and beneath the upper platform. By way of example and without limitation, in one embodiment, the predetermined threshold D may be less than about 1.0 meters. In a preferred embodiment, the predetermined threshold may be less than about 0.5 meters. In an exemplary embodiment, the predetermined threshold may be about 350 millimeters. Of course, depending on the features of the nacelle 26 and tower 14, the predetermined threshold D may have other values. Those of ordinary skill in the art will understand how to determine the threshold given the parameters of the particular nacelle 26 and tower 14.

Aspects of the invention use various systems, subsystems, devices, etc. to ensure that a vertical separation distance between the mounting interface 34 of the nacelle 26 and the mounting flange 36 of the upper tower section 20 stays below the predetermined threshold D when the mounting interface 34 vertically overlaps the mounting interface 36 during assembly. With reference to FIGS. 1, 2A, and 2B, the nacelle 26 may be initially lifted upwards by the crane 22 alongside the tower 14 such that the mounting interfaces 34, 36 do not vertically overlap. More particularly, the nacelle 26 may be positioned relative to the upper tower section 20 such that the mounting interface 34 is located a vertical distance above the mounting interface 36, where the vertical distance is not greater than and preferably substantially at the predetermined threshold D. With the nacelle 26 substantially at the predetermined threshold D, the crane 22 may be maneuvered to move the nacelle 26 over the top of the upper tower section 20 and bring the mounting interfaces 34, 36 into substantially complete vertical overlapping relationship while substantially maintaining the predetermined threshold D to the extent possible during the maneuvering.

In accordance with this aspect of the invention, a separation verification device may be provided to verify that the vertical distance between the mounting interfaces 34, 36 is at and does not exceeded the predetermined threshold D. In one embodiment, for example, the separation verification device may include a signal transmitter and a signal receiver. In an exemplary embodiment, for example, the signal transmitter may be a laser transmitter 40 and the signal receiver may be a laser receiver 42. As shown in FIGS. 2A and 2B, the laser transmitter 40 may be attached to the upper tower section 20 and extend slightly above the uppermost part of the upper tower section 20. The laser transmitter 40 is configured to emit a laser beam that rotates fast enough to effectively create a horizontal plane of laser light 44 that travels in all directions from the laser transmitter 40. In this embodiment, the laser receiver 42 may be attached to the nacelle 26 so as to extend slightly below the tower connection section 32. The laser receiver 42 may include one or more (e.g., an array) laser light receiving members 46 (FIG. 5) that are configured to recognize when a particular receiving member 46 is being illuminated by the horizontal plane of laser light 42. For example, the laser receiver 42 may include a below indicator 48, an on-target indicator 50, and an above indicator 52, each of which are operatively coupled to the laser light receiving members 46. While in the above embodiment, the laser transmitter 40 was attached to the upper tower section 20 and the laser receiver 42 was attached to the nacelle 26, it should be recognized that in another alternative embodiment, the laser transmitter 40 may be attached to the nacelle 26 and the laser receiver 42 may be attached to the upper tower section 20.

Figure 5:
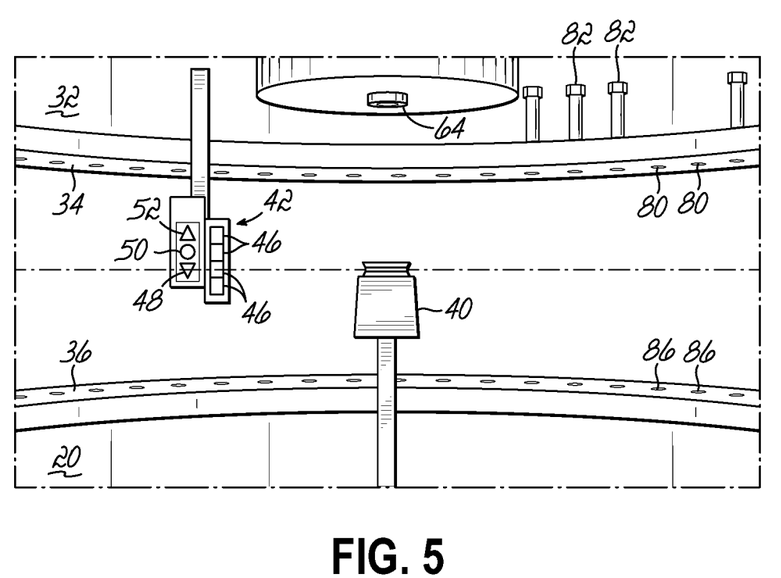
FIG. 5 is an exemplary field of view of what a tower approach camera mounted on the nacelle may see during the assembly process.

In use, the on-target indicator 50 will illuminate such as with a green light, for example, when the appropriate laser light receiving member 46 is illuminated with the horizontal plane of laser light 44 from the laser transmitter 40. When the on-target indicator 50 illuminates, this indicates that the bottom of the mounting interface 34 of the nacelle 26 is above the top of the mounting interface 36 of the upper tower section 20 by the predetermined threshold D. When the below indicator 48 illuminates, such as with a red light, for example, this indicates that the mounting interface 34 of the nacelle 26 is less than the predetermined threshold D away from the mounting interface 36 of the upper tower section 20. Similarly, when the above indicator 52 illuminates, such as with another red light, for example, this indicates that the mounting interface 34 of the nacelle 26 is more than the predetermined threshold D away from the mounting interface 36 of the upper tower section 20. At some point, the vertical distance between the mounting interfaces 34 36 will be either too large or too small such that the horizontal plane of laser light 44 does not illuminate any of the laser light receiving members 46. In this condition, none of the indicators 48, 50, 52 will illuminate. In other words, when none of the indicators 48, 50, 52 are illuminated, that is an actual indication that the laser light receiving members 46 (and thus the laser receiver 42) are not receiving a laser signal from the laser transmitter 40.

As noted above, prior to lifting the nacelle 26 to the top of the tower 14, the laser transmitter 40 may be positioned in the upper tower section 32 and the laser receiver 42 may be positioned in the nacelle 26 such that the on-target indicator 50 will illuminate when the mounting interface 34 of the nacelle 26 is above the mounting interface 36 of the upper tower section 20 by the predetermined threshold D. As the nacelle 26 is lifted upwards, the laser transmitter 40 will be operational and generate the horizontal plane of laser light 44. The nacelle 26 will be lifted up along the side of tower 14 and as the mounting interface 34 clears to top of the upper tower section 20, the horizontal plane of laser light 44 will begin to illuminate the laser light receiving members 46. Initially, the laser light receiving members 46 will cause the below indicator 48 to illuminate to signify that the mounting interface 34 is below the predetermined threshold D. As such, the crane operator may continue to slightly lift the nacelle 26 until the horizontal plane of laser light 44 illuminates the proper laser light receiving member 46 that will cause the on-target indicator 50 to illuminate. At this point, the crane operator will stop lifting the nacelle 26. With the nacelle 26 now at the predetermined threshold D, the crane operator may maneuver the nacelle 26 over the top of the upper tower section 20 as depicted in FIG. 2B.

Per safety protocols, and as noted above, no technicians may be on the upper platform at the exposed end of the upper tower section 20 while the crane maneuvers the nacelle 26 into position over the upper tower section 20. Consequently, there is no one physically in place to observe/monitor the different indicators 48, 50, 52 to inform the crane operator whether the nacelle 26 is below, at, or above the predetermined threshold D. To address this issue and in accordance with another aspect of the invention, a vision system may be provided to observe/monitor the different indicators 48, 50, 52.

Figure 3:
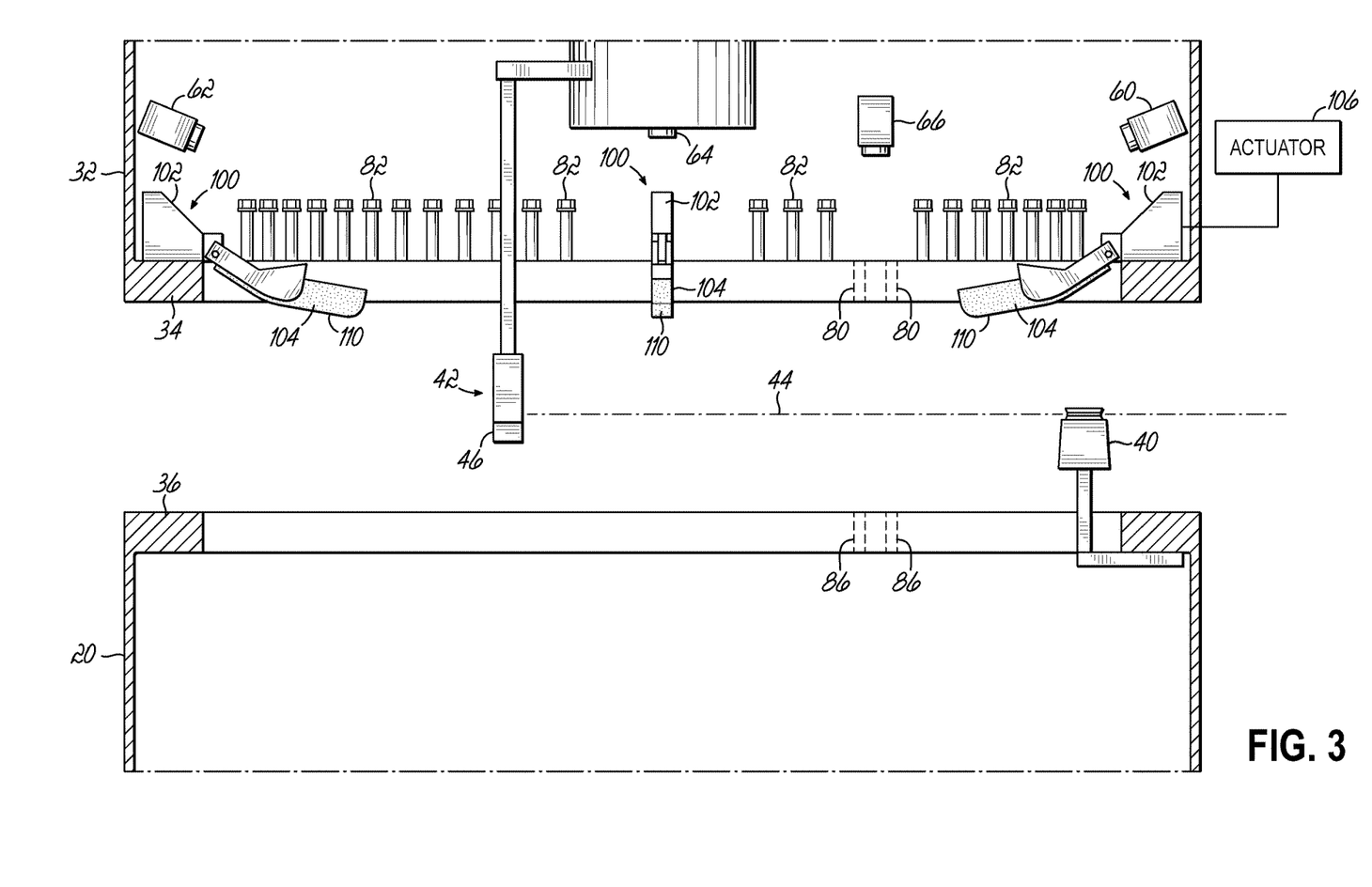
FIG. 3 is a partial, enlarged cross-sectional view of the nacelle of FIG. 2B positioned above the tower at a predetermined height.

In one embodiment, the vision system may include a plurality of video cameras for observing certain aspects of the assembly process. This allows certain tasks to be completed without personnel being in the immediate vicinity of the mating interfaces 34, 36. In an exemplary embodiment, the vision system may include four video cameras: a laser video camera 60, a tower-approach video camera 62, an axial alignment video camera 64, and a rotational alignment video camera 66, as depicted in FIG. 3. In alternative embodiments, the vision system may include more or less video cameras. In an exemplary embodiment, the video cameras 60, 62, 64, 66 may each be attached to the nacelle 26 adjacent the mounting interface 34. It should be understood, however, that in an alternative embodiment, the video cameras 60, 62, 64, 66 may be attached to the upper tower section 20 adjacent the mounting interface 36. In a still further alternative embodiment, some of the video cameras 60, 62, 64, 66 may be attached to the nacelle 26 and some of the video cameras 60, 62, 64, 66 may be attached to the upper tower section 20. In any event, the vision system provides "eyes" on the mating interfaces 34, 36 without personnel being in the immediate vicinity.

A representative depiction of what the laser video camera 60 may "see" is depicted in FIG. 5. As illustrated, the laser video camera 60 may be configured to view the laser receiver 42 and the indicators 48, 50, 52 positioned thereon. The video feed from the laser video camera 60 may be sent to a video receiving unit (not shown), such as a monitor, that is being viewed/monitored by a crane communicator or signaler, i.e., a person giving movement instructions to the crane operator, who is located away from the upper tower section 20. By viewing the video feed from the laser video camera 60, the crane communicator can determine whether the nacelle 26 is too low, too high, or at the predetermined threshold D based on which of the indicators 48, 50, 52 are illuminated. As noted above, if none of the indicators 48, 50, 52 are illuminated, the mounting interface 34 of the nacelle 26 may be positioned too far below or too far above the mounting interface 36 of the upper tower section 20.

As a backup to the laser video camera 60 viewing the indicators 48, 50, 52, the laser receiver 42 may be configured to also wirelessly transmit the "distance information" that the laser receiver 42 uses when it illuminates the indicators 48, 50, 52. That distance information may be transmitted to a technician who is in radio communication with a the crane communicator. Should the laser video camera 60 become inoperable, the tower assembly process may continue using the transmitted distance information received by the technician and relayed to the crane communicator. The ability of the laser receiver 42 to transmit distance information to the technician independent of the laser video camera 60 provides another layer of safety to the tower assembly process.

Figure 4:
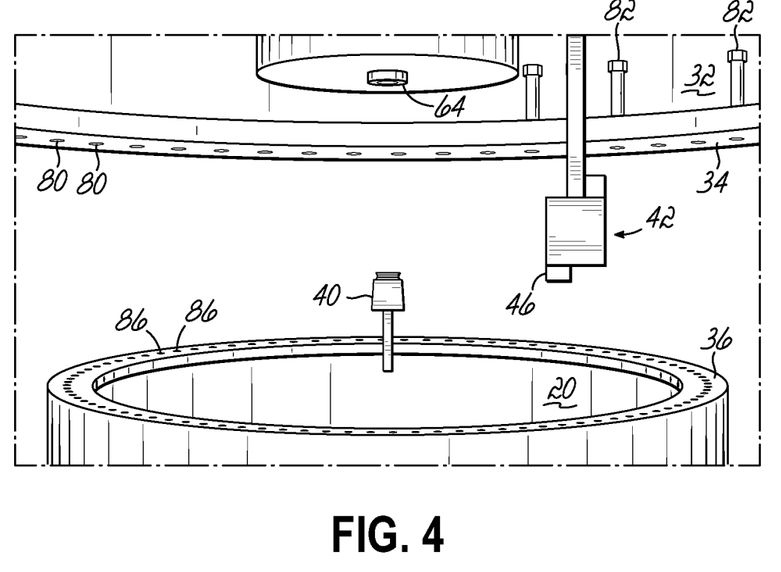
FIG. 4 is an exemplary field of view of what a laser camera mounted on the nacelle may see during the assembly process.

The crane communicator can also view/monitor the video feed from the tower approach video camera 62. A representative depiction of the what the tower approach video camera 62 may "see" is depicted in FIG. 4. The tower approach camera 62 allows the crane communicator to visualize the tower as the nacelle 26 is lifted up and maneuvered over the top of the tower. The tower approach video camera 62 provides the crane communicator additional verification that the mounting interface 34 will clear the mounting interface 36 of the upper tower section 20 as the nacelle 26 is being moved into place over the upper tower section 20.

Figure 6A:
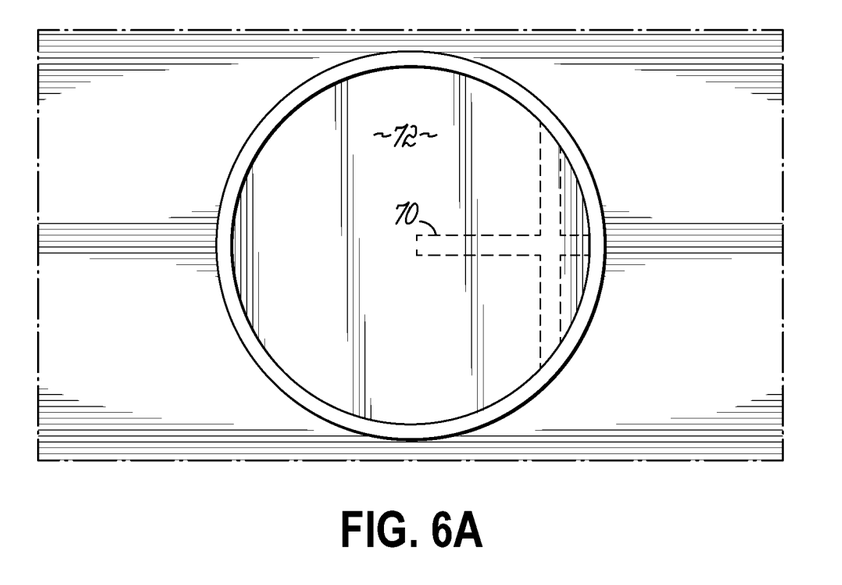
FIG. 6A is an exemplary field of view of what an axial alignment camera mounted on the nacelle when the longitudinal tower axis is not yet aligned with the longitudinal nacelle axis.
Figure 6B:
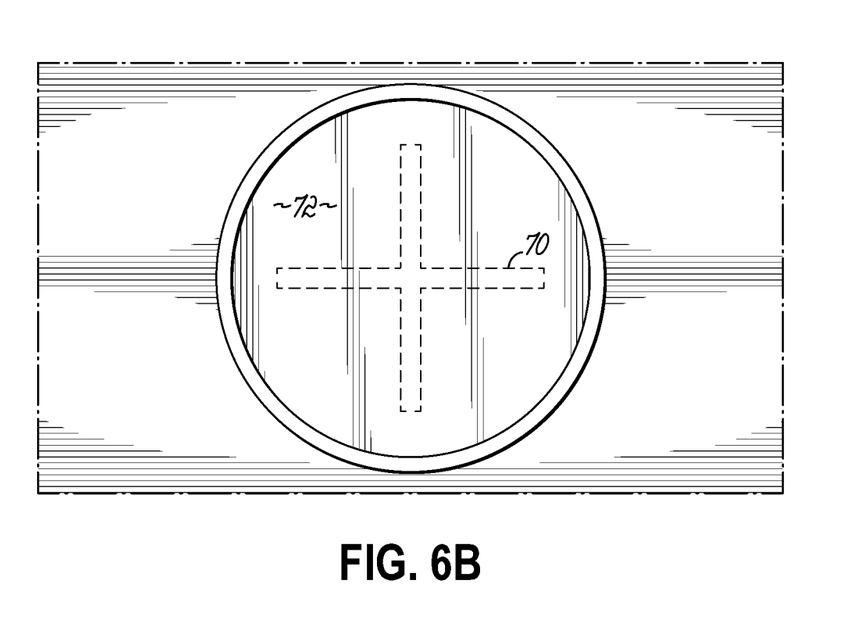
FIG. 6B is an exemplary field of view of the axial alignment camera when the longitudinal tower axis is generally aligned with the longitudinal nacelle axis.

The axial alignment video camera 64 is, in one embodiment, positioned generally along the center line of the mounting interface 34 and is pointed downwardly so that it may look down into the upper tower section 20 as the nacelle 26 is maneuvered into place. In this embodiment, the upper tower section 20 may have a target 70 that is generally aligned with the longitudinal axis of the tower 14. An illustrative field of view 72 of the axial alignment video camera 64 is depicted in FIGS. 6A and 6B. As the nacelle 26 is maneuvered over the top of the upper tower section 20, the alignment target 70 begins to come into view in the field of view 72 of the axial alignment video camera 64 as depicted in FIG. 6A. In FIG. 6B, the alignment target 70 is generally centered in the field of view 72, which means the longitudinal nacelle axis NA is generally aligned with the longitudinal tower axis TA. During the assembly process, the crane communicator may view the video feed from the axial alignment video camera 64 and communicate the appropriate instructions to the crane operator so the crane operator may move the nacelle 26 as needed until the view from the axial alignment camera 64 looks like what is depicted in FIG. 6B, for example.

Figure 7A:
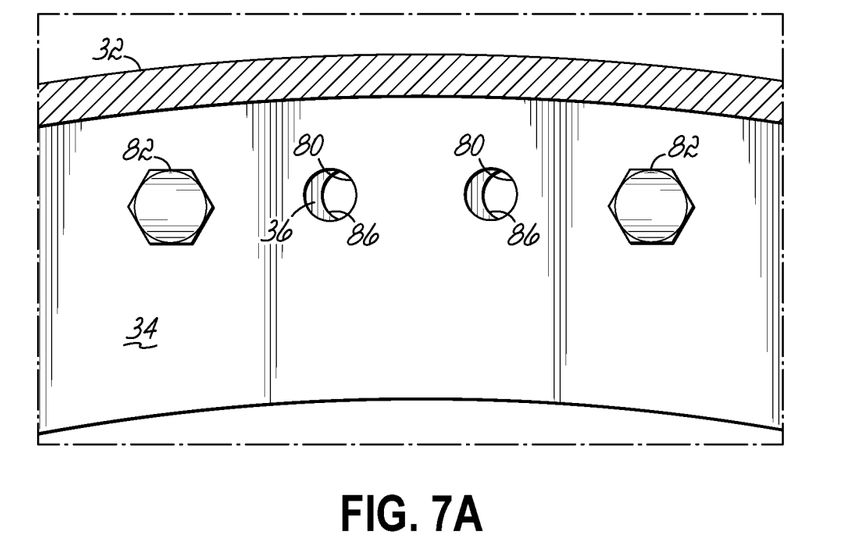
FIG. 7A is an exemplary field of view of what a rotational alignment camera positioned downward onto the mounting interface/flange of the nacelle may see while rotationally aligning the lower flange of the nacelle with the upper flange of the tower.
Figure 7B:
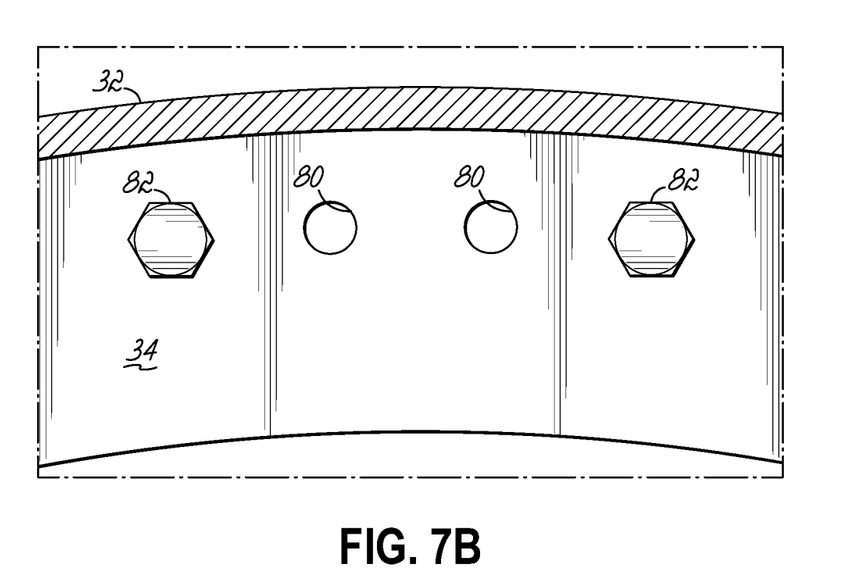
FIG. 7B is an exemplary field of view of what the rotational alignment camera may see when the mounting interface/flange of the nacelle is rotationally aligning with the mounting interface/flange of the tower.

After the nacelle 26 is axially aligned with the tower, the nacelle 26 may need to be rotationally aligned with the upper tower section 20. In this regard, the mounting interface 34 on the nacelle 26 may include a plurality of through holes 80 sized to receive bolts 82 as depicted in FIG. 3. Similarly, the mounting interface 36 includes a plurality of through holes 86 sized to receive bolts 82. During the assembly process, most of the bolts 82 are pre-positioned in the through holes 80 in the mounting interface 36 of the nacelle 26. The bolts 82, however, do not entirely extend through the mounting interface 34 so they will not interfere with the mounting interface 34 when the nacelle 26 is lowered onto the upper tower section 20. In an exemplary embodiment, one or more of the through holes 80 may be left clear, i.e., free of bolts 82, so the rotational alignment video camera 66 may look down into the through holes 80 and onto the mounting interface 36 and its through holes 86. FIGS. 7A and 7B depict an illustrative field of view from the rotational alignment video camera 66 during the tower assembly process.

After the nacelle 26 is axially aligned with the upper tower section 20 (FIG. 6B), the nacelle 26 may need to be rotated such that the through holes 80 of the mounting interface 34 are aligned with the through holes 86 of the mounting interface 36. FIG. 7A depicts the through holes 80 not in full rotational alignment with the through holes 86. The crane communicator will see this misalignment from the video feed from the rotational alignment camera 66 and inform the crane operator accordingly. The crane operator may manipulate the spreader bar 28 such that it rotates the nacelle 26 about the lifting cable 30. After sufficient rotation of the nacelle 26, the through holes 80 will be generally aligned with the through holes 86 as depicted in FIG. 7B. With the nacelle 26 axially and rotationally aligned with the upper tower section 20, the crane communicator may then instruct the crane operator to begin lowering the nacelle 26 towards the upper tower section 20.

As the nacelle 26 is being lowered, the crane communicator will continually monitor the video feeds from at least the axial alignment video camera 64 and the rotational alignment video camera 66 to ensure that nacelle 26 stays properly aligned with the upper tower section 20 until the mounting interface 34 of the nacelle 26 contacts the mounting interface 36 of the upper tower section 20. If at any time during the lowering process the crane communicator observes, based on the video feeds, that the nacelle 26 is no longer properly aligned with the upper tower section 20, the crane communicator may instruct the crane operator to stop lowering the nacelle 26 and instruct the crane communicator to move/rotate the nacelle 26 to realign it with the upper tower section 20.

Figure 8A:
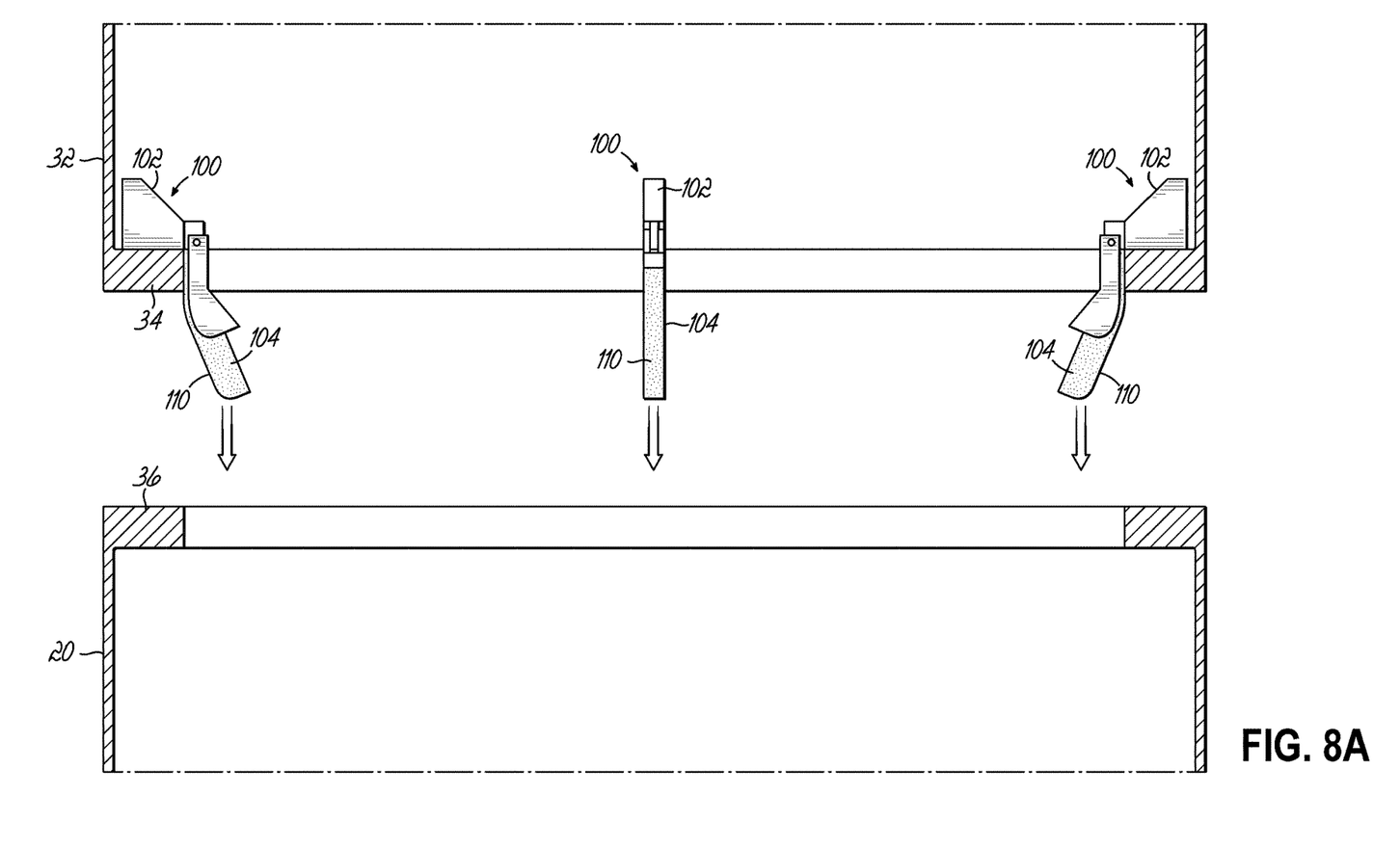
FIG. 8A is a partial, enlarged cross-sectional view of the nacelle positioned above the tower with the alignment guides deployed.
Figure 8B:
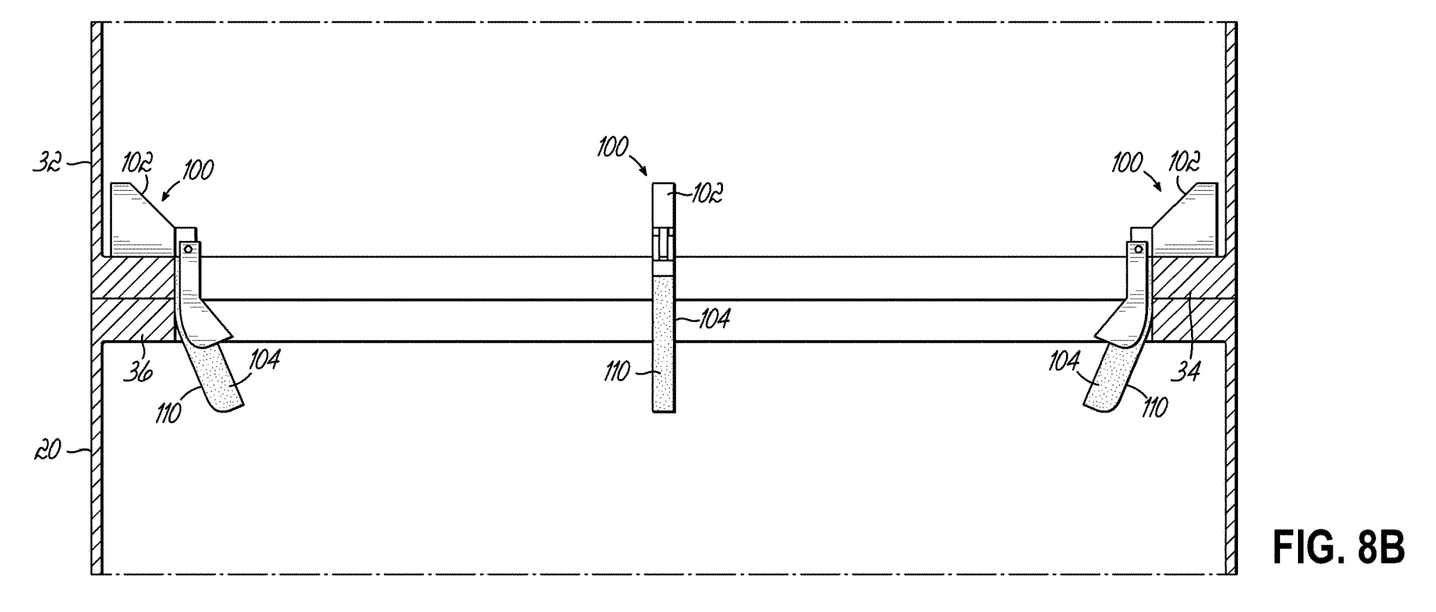
FIG. 8B is a partial, enlarged cross-section view of the nacelle positioned upon the top of the tower with the alignment guides deployed.

With reference to FIGS. 3, 8A, and 8B, to assist with maintaining axial alignment of the nacelle 26 while the nacelle 26 is being lowered onto the upper tower section 20, one or more alignment guides 100 may be provided. In one embodiment, the one or more alignment guides may be attached to the upper surface of the mounting interface 34 of the nacelle 26. In an exemplary embodiment, there may be four alignment guides 100 spaced about 90 degrees to each other around the periphery of the mounting interface 34. However, more or less alignment guides 100 may be provided in alternative embodiments. Each alignment guide 100 may include a mounting structure 102 for securing the alignment guide 100 to the mounting interface 34. Each alignment guide 100 may also include a guide member 104 pivotally connected to the mounting structure 102. Moreover, each alignment guide 100 may further include an actuator (shown schematically at 106) configured to move the guide member 104 between a retracted position (FIG. 3) to a deployed position (FIG. 8A). The actuator 106 may take a wide range of forms, including an electric actuator, pneumatic actuator, hydraulic actuator, or other type of actuator. In an exemplary embodiment, the actuator 106 may be activated remotely to move the guide member 104 from the retracted position to the deployed position. In operation, the guide members 104 may be activated all at once or they may be activated individually in any desired sequence.

In use, each guide member 104 includes a guide surface 110 configured to engage the mounting interface 36 of the upper tower section 20 as the nacelle 26 is lowered to the upper tower section 20. Collectively, the guide surfaces 110 of the four alignment guides 100 help to axially align the mounting interface 34 with the mounting interface 36 as the nacelle 26 gets closer to the upper tower section 20. The guide surfaces 110 depicted in FIG. 8A are sloped so that together the guide surfaces 110 act essentially as a funnel to guide the nacelle 26, and more particularly, the mounting interface 34 thereof into axial alignment with the mounting interface 36 of the upper tower section 20. FIG. 8B depicts the alignment guides 100 deployed and the mounting interface 34 resting upon and axially aligned with the mounting interface 36. The operation of the alignment guides 100 may be monitored by at least laser video camera 60 and the tower approach video camera 62 as depicted in FIG. 3.

It should be understood that the alignment guides 100 are not limited to the configuration depicted in FIGS. 3, 8A, and 8B and alignment guides of other configurations may be employed to assist with axial alignment of the nacelle 26 to the upper tower section 20. For instance, one alignment guide may include a guide member that moves linearly with respect to the mounting structure 102 instead of pivoting like guide member 104. The guide member may have an arcuate shape and move up and down between a retracted position and a deployed position via a pinion gear, for example. Alternatively, the guide member may pivot relative to the mounting structure along a plane tangential to the circumference of the mounting interface 34 as opposed to a plane perpendicular to the circumference of the mounting interface 34, like the alignment guide 100. Moreover, in an alternative embodiment, the one or more alignment guides 100 may be mounted to the upper tower section 20 instead of to the nacelle 26. Thus, the one or more alignment guides may take a wide range of configurations and arrangements on the nacelle 26 and/or upper tower section 20.

After the mounting interface 34 is secured to the mounting interface 36 with bolts 82, the one or more alignment guides 100 may be removed from the mounting interface 34 so that they may be used on another wind turbine installation. Similarly, the laser transmitter 40 and the laser receiver 42, as well as the four video cameras 60, 62, 64, 66 may likewise be removed from the nacelle 26 and the upper tower section 20 so that they may be used on another wind turbine installation. Thus, these items do not form a permanent part of the wind turbine but are temporarily attached to the components thereof for assembly purposes. These items may be repeatedly used to assemble other wind turbines, such as those in a wind park or the like.

The system and method described above focused on lifting a nacelle 26 and placing it on top of the upper tower section 20 of the wind turbine 10. Aspects of the invention, however, are not so limited and the system and method are applicable to other wind turbine components. By way of example, the system and method described above may be beneficial in the assembly of the tower 14, which may be made from several tower sections 16, 18, 20 stacked one top of the other. More particularly, the system and method described above may be used to assemble one tower section (the "second" tower section) on top of another tower section (the "first" tower section) in a manner similar to how the nacelle 26 was assembled on top of the upper tower section 20.

In this embodiment, the second tower section includes the laser receiver 42, video cameras 60, 62, 64, 66, and alignment guides 100, and the first tower section includes the laser transmitter 40. The crane communicator uses the video feed from at least the laser video camera 60 to place the mounting interface of the second tower section at a predetermined threshold D above the mounting interface of the first tower section. The crane operator then maneuvers the second tower section towards the first tower section. The crane communicator will continually view the video feed from the laser video camera 60 and the tower approach video camera 62 until the second tower section is generally over top the first tower section. The crane communicator will then begin to monitor the video feeds from the axial-alignment camera 64 and the rotational-alignment camera 66 until the second tower section is axially and rotationally aligned with the first tower section. Once aligned, the alignment guides 100 will be deployed and the crane communicator will instruct the crane operator to lower the second tower section toward the first tower section. The alignment guides 100 will assist in the final alignment of the second tower section with the first tower section just before contact between the two sections. The system and method is employed so that the vertical distance between the mounting interfaces on the first tower section and the second tower section does not exceed the predetermined threshold D at any time when the mounting interface on the second tower section vertically overlaps the mounting interface on the first tower section during assembly.

In a further embodiment, the system and method may also be used to lift and place the lower tower section 16 onto a foundation 15 of the wind turbine 10 (see FIG. 1). When lifting the lower tower section 16 into place, the system and method is implemented in a manner similar to how the system and method were described above for lifting and placing the nacelle 26 onto the upper tower section 20. In this regard, the lower tower section 16 includes the laser receiver 42, video cameras 60, 62, 64, 66, and one or more alignment guides 100 and the foundation 15 includes the laser transmitter 40. The crane communicator uses the video feed from at least the laser video camera 60 to place the mounting interface of the lower tower section 16 at a predetermined threshold D above the mounting interface of the foundation. The crane operator then maneuvers the lower tower section 16 towards the foundation 15. The crane communicator will continually view the video feed from the laser video camera 60 and the tower approach video camera 62 until the lower tower section 16 is generally over the foundation 15. The crane communicator will then begin to monitor the video feeds from the axial-alignment camera 64 and the rotational-alignment camera 66 until the lower tower section 16 is axially and rotationally aligned with the foundation 15. Once aligned, the alignment guides 100 will be deployed and the crane communicator will instruct the crane operator to lower the lower tower section onto the foundation 15. The alignment guides 100 will assist in the final alignment of the lower tower section 16 with the foundation 15 just before contact between the two components. The system and method is employed so that the vertical distance between the mounting interfaces on the lower tower section 16 and the foundation 15 does not exceed the predetermined threshold D at any time when the mounting flange of the lower tower section 16 vertically overlaps the mounting flange on the foundation 15 during assembly.

While the present invention has been illustrated by a description of various preferred embodiments and while these embodiments have been described in some detail, it is not the intention of the Applicant to restrict or in any way limit the scope of the appended claims to such detail. For example, while the wind turbine components assembled using the disclosed system and method include tower sections, nacelles, and foundations, the system and method may also be used to assemble other wind turbine components and aspects of the invention should not be limited to those shown and described herein. Additional advantages and modifications will readily appear to those skilled in the art. Thus, the various features of the invention may be used alone or in any combination depending on the needs and preferences of the user.

The invention claimed is:

1. A method for assembling a wind turbine having a first wind turbine component with a first mounting interface and a second wind turbine component with a second mounting interface configured to be connected to the first wind turbine component at the first mounting interface, the method comprising:
   positioning the second wind turbine component relative to the first wind turbine component such that the second mounting interface is located a vertical distance above the first mounting interface;
   determining whether the vertical distance between the first and second mounting interfaces exceeds a predetermined threshold (D);
   providing an indicator on one of the first or second wind turbine components for indicating when the vertical distance between the first and second mounting interfaces exceeds the predetermined threshold (D);
   providing a first indication when the indicator determines that the vertical distance between the first and second mounting interfaces is substantially at or less than the predetermined threshold (D);
   providing a second indication when the indicator determines that the vertical distance between the first and second mounting interfaces exceeds the predetermined threshold (D); and
   as long as the second indication is not provided, the method further comprises:
      aligning the second mounting interface to the first mounting interface;
      lowering the second wind turbine component toward the first wind turbine component so that the first mounting interface and the second mounting interface contact each other; and
      connecting the second mounting interface to the first mounting interface.

2. The method of claim 1, wherein determining whether the vertical distance between the first and second mounting interfaces exceeds the predetermined threshold (D) further comprises:
   transmitting a signal from a transmitter attached to one of the first or second wind turbine components; and
   receiving the signal by a receiver attached to the other of the first or second wind turbine components.

3. The method of claim 1, further comprising:
   monitoring the indicator using a tower approach camera mounted to one of the first or second wind turbine components.

4. The method of claim 1, wherein aligning the second mounting interface to the first mounting interface further comprises:
   mounting an axial alignment camera to one of the first or second wind turbine components; and
   using the axial alignment camera to axially align the second mounting interface to the first mounting interface.

5. The method of claim 1, wherein aligning the second mounting interface to the first mounting interface further comprises:
   mounting a rotational alignment camera to one of the first or second wind turbine components; and
   using the rotational alignment camera to rotationally align the second mounting interface to the first mounting interface.

6. The method of claim 1, wherein aligning the second mounting interface to the first mounting interface further comprises:
   providing at least one alignment guide mounted to one of the first or second wind turbine components, wherein the at least one alignment guide is moveable from a retracted position to a deployed position; and
   moving the at least one alignment guide from the retracted position to the deployed position,
   wherein when in the deployed position, the at least one alignment guide is configured to contact the other of the first or second wind turbine components to facilitate axially aligning the second mounting interface with the first mounting interface.

7. A system for assembling a wind turbine having a first wind turbine component with a first mounting interface and a second wind turbine component with a second mounting interface configured to be connected to the first wind turbine component at the first mounting interface, the system comprising:
   a separation verification device including a transmitter configured to be coupled to one of the first or second wind turbine components and a receiver configured to be coupled to the other of the first or second wind turbine components, wherein the separation verification device is configured to determine whether a vertical distance between the first and second mounting interfaces exceeds a predetermined threshold (D); and
   an indicator configured to be coupled to one of the first or second wind turbine components and configured to provide an indication when the vertical distance between the first and second mounting interfaces exceeds the predetermined threshold (D),
   wherein at any time during assembly when the second mounting interface vertically overlaps the first mounting interface and the vertical distance exceeds the predetermined threshold (D), the indicator is configured to provide the indication,
   wherein the indicator is configured to provide a first indication when the transmitter and receiver determine that the vertical distance between the first and second mounting interfaces is at or less than the predetermined threshold (D), and
   wherein the indicator is configured to provide a second indication when the transmitter and receiver determine that the vertical distance between the first and second mounting interfaces exceeds the predetermined threshold (D).

8. The system of claim 7, wherein the transmitter includes a laser transmitter and the receiver includes a laser receiver.

9. The system of claim 7, further comprising a tower approach camera configured to be mounted to one of the first or second wind turbine components and configured to view the indicator.

10. The system of claim 7, further comprising an axial alignment camera configured to be mounted to one of the first or second wind turbine components and configured to facilitate axial alignment of the first and second mounting interfaces.

11. The system of claim 7, further comprising a rotational alignment camera configured to be mounted to one of the first or second wind turbine components and configured to facilitate rotational alignment of the first and second mounting interfaces.

12. The system of claim 7, further comprising at least one alignment guide moveable between a retracted position and a deployed position, wherein the at least one alignment guide is configured to be coupled to one of the first or second wind turbine components, and wherein when in the deployed position, the at least one alignment guide is configured to contact the other of the first or second wind turbine component to facilitate axially aligning the second mounting interface with the first mounting interface.

13. The system of claim 12, wherein the at least one alignment guide is remotely actuatable to move between the retracted position and the deployed position.

* * * * *

UNITED STATES PATENT AND TRADEMARK OFFICE
CERTIFICATE OF CORRECTION

PATENT NO. : 12,276,252 B2
APPLICATION NO. : 18/566139
DATED : April 15, 2025
INVENTOR(S) : Babak Saboori It is certified that error appears in the above-identified patent and that said Letters Patent is hereby corrected as shown below:

In the Claims

Column 13, Claim 1, Line 21, change "is substantially at" to -- is at --.

Signed and Sealed this
First Day of July, 2025

Coke Morgan Stewart
*Acting Director of the United States Patent and Trademark Office*